United States Patent [19]
Higashikata et al.

[11] Patent Number: 6,046,688
[45] Date of Patent: *Apr. 4, 2000

[54] NAVIGATION SYSTEM

[75] Inventors: Tsuyoshi Higashikata; Ryo Tanaka, both of Nagoya, Japan

[73] Assignees: Harness Systems Technologies Research, Ltd.; Sumitomo Wiring Systems, Ltd.; Sumitomo Electric Industries, Ltd., all of, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,659

[22] Filed: Dec. 2, 1997

[30] Foreign Application Priority Data

Dec. 11, 1996 [JP] Japan ................................ 8-330974

[51] Int. Cl.$^7$ .................................................. G08G 1/123
[52] U.S. Cl. ......................... 340/995; 340/988; 701/208; 701/211; 701/213
[58] Field of Search ..................................... 340/988, 995, 340/990, 905, 961, 903, 435; 701/208, 209, 211, 213

[56] References Cited

U.S. PATENT DOCUMENTS

| | | | |
|---|---|---|---|
| 3,997,868 | 12/1976 | Ribnick et al. | 340/902 |
| 4,694,295 | 9/1987 | Miller et al. | 340/903 |
| 4,835,537 | 5/1989 | Manion | 340/961 |
| 4,860,007 | 8/1989 | Konicke et al. | 340/979 |
| 4,914,733 | 4/1990 | Gralnick | 340/961 |
| 5,111,400 | 5/1992 | Yoder | 342/29 |
| 5,179,377 | 1/1993 | Hancock | 340/961 |
| 5,270,936 | 12/1993 | Fukushima et al. | 340/988 |
| 5,444,629 | 8/1995 | Kishi et al. | 340/995 |
| 5,652,706 | 7/1997 | Morimoto et al. | 340/460 |

*Primary Examiner*—Brent A. Swarthout
*Attorney, Agent, or Firm*—John B. Bierman; Bierman, Muserlian and Lucas

[57] ABSTRACT

A navigation system can indicate a relationship in position between a main vehicle and a related vehicle without reducing a map picture on a display unit. A second display unit (6a) is provided independently of a first display unit (3a) for a map picture in a navigation system. The second display unit (6a) indicates a position of the related vehicle by means of a direction (11) relative to the main vehicle and a distance (12) from the main vehicle to the related vehicle. Preferably, the direction (11) and distance (12) are indicated by an arrow or characters and by digits, respectively. This makes the display obvious.

3 Claims, 5 Drawing Sheets

NAVIGATION SYSTEM

BACKGROUND OF THE INVENTION

This invention relates to a navigation system and more particularly to a display of a location or position of another vehicle in a display unit in the navigation system.

In a satellite navigation system, a location or position of an automotive vehicle is indicated in a map picture on a display unit by means of points, signs and the like. For convenience of explanation, a typical example of a conventional navigation system will be described below by referring to FIG. 5. FIG. 5 is a schematic explanatory view of a conventional navigation system.

A terminal device 20 in a conventional navigation system, as shown in FIG. 5, comprises a GPS (Global Positioning System) receiving unit 21 which receives satellite signals transmitted from a plurality of GPS satellites 30 at an antenna 21a, a signal processing unit 22 and a display unit 23.

In this system, when the GPS receiving unit 21 receives satellite signals from the plurality GPS satellites 30, the signal processing unit 22 computes a position in coordinates on the basis of the received signals and translates the computed data of the position in coordinates into a figure such as a point, a sign, or the like to indicate the figure on the display unit 23.

Such a system is utilized in a display of position of not only in a main vehicle but also a related vehicle in the case that a plurality of vehicles are moving. If each vehicle is provided with a transmitting and receiving unit (transceiver), which communicates with a navigation terminal device in the related vehicle with respect to position data in coordinates, in addition to the same navigation system, it is possible to transmit the position data in coordinates in a main vehicle to respective related vehicles and to indicate the positions of all such vehicles on respective map pictures.

Since the location of a plurality of vehicles can be mapped, such a system is of obvious benefit when a number of vehicles are travelling together.

However, the system involves the following problems. When the display unit indicates the positions of the main and related vehicles at the same time in order to map a position between the vehicles, a map picture needs to be reduced in the case where the vehicles are separated from each other, since the position of the related vehicle is indicated on the map picture which displays the position of the main vehicle. Then, information on the map picture such as characters, map signs, and the like is reduced so that it becomes difficult to view.

SUMMARY OF THE INVENTION

An object of the present invention is to provide a navigation system which can indicate a relationship in position or location between a main vehicle and a related vehicle without the need to reduce a map picture on a display unit.

In order to achieve the above object, a navigation system of the present invention comprises: a first display unit for indicating a map picture; and a second display unit for indicating a position or a location of a related vehicle by means of a direction relative to a main vehicle and a distance from the main vehicle to the related vehicle. When it is necessary to know the position of the related vehicle with respect to the position of the main vehicle, since the respective indications can be shown on individual displays, the map picture which shows the position of the main vehicle is not reduced and thus it is easy for a person to see the contents of the map picture.

It is possible for a person to readily grasp the position of the related vehicle, since the direction of the position of the related vehicle is indicated by an arrow or characters and the distance from the main vehicle to the related vehicle is indicated by digits.

DETAILED DESCRIPTION OF THE PREFERRED EMBODIMENTS

Figure 1:
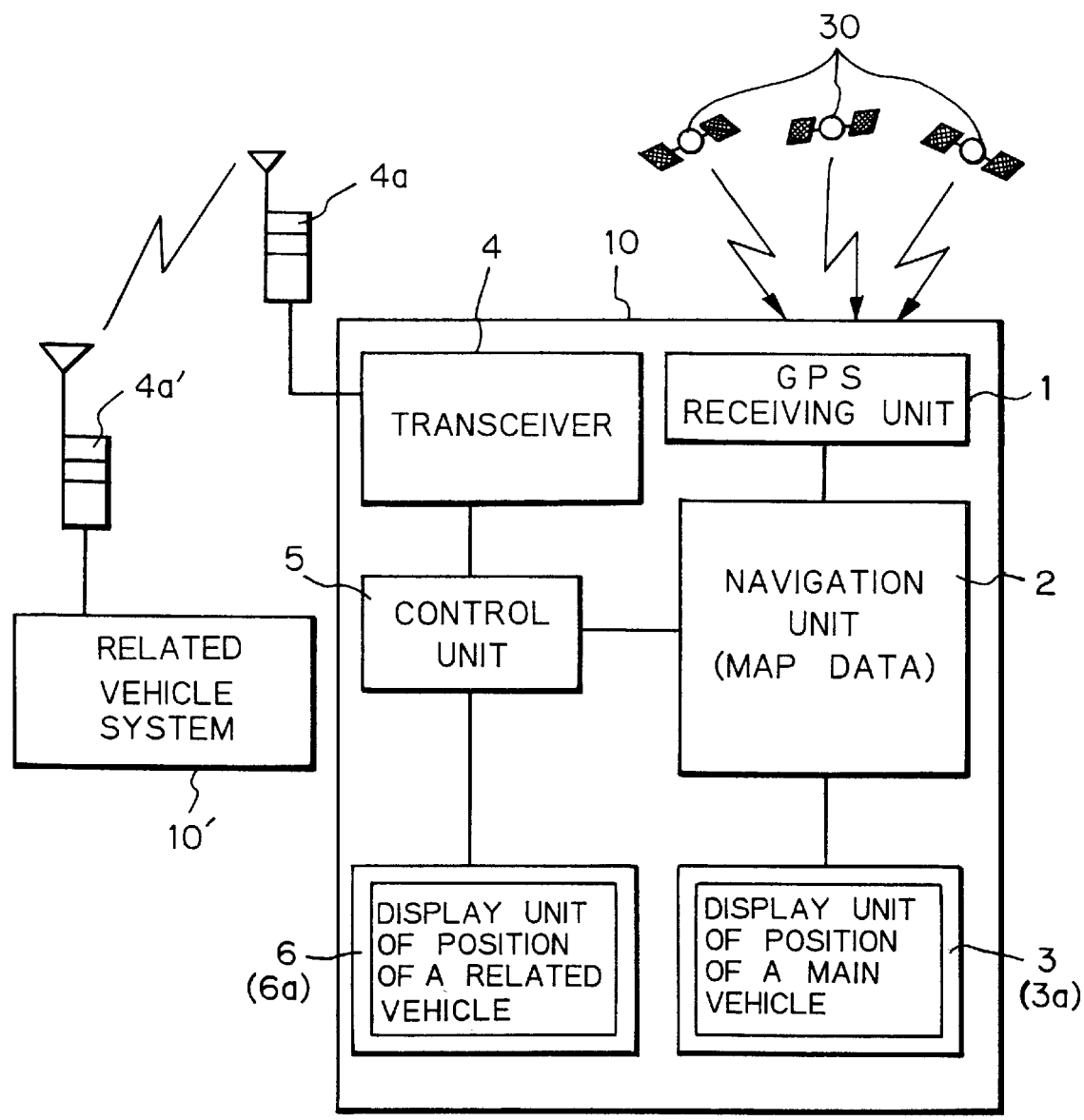
FIG. 1 is a block diagram of an embodiment of a navigation system in accordance with the present invention.

Referring now to FIGS. 1 to 4, an embodiment of a navigation system in accordance with the present invention will be described below. A navigation terminal device 10 in the embodiment shown in FIG. 1 includes a GPS receiving unit 1 which receives signals from a GPS satellite 30, a navigation unit 2 to which the GPS receiving unit 1 is connected and in which map data are stored, a display unit 3 of position or location of a main vehicle (display 3a) which is connected to the navigation unit 2 and indicates a position of a main vehicle, a transmitting and receiving device (transceiver device) 4a such as a portable telephone set, a radio set, or the like which communicates with the related vehicle, and a transmitting and receiving unit (transceiver) 4 to which the device 4a is connected. The transceiver 4 and the navigation unit 2 are connected to a control unit 5. A display unit 6 of position of the related vehicle (display 6a) which indicates a position of a related vehicle is connected to the control unit 5.

Next, an operation of the navigation system will be described below. When the GPS receiving unit 1 receives satellite signals from a plurality of GPS satellites 30, a signal processor (not shown) in the navigation unit 2 computes a position in coordinates of the main vehicle in accordance with the received signals and translates the computed data of position in coordinates into figures such as dots, signs, or the like to indicate them on the display 3a in the display unit 3 of position of the main vehicle.

On the other hand, the transceiver 4 receives radio wave signals from the transceiver device 4a' such as a portable telephone set, a radio set, or the like in the system 10' of the related vehicle by means of the transceiver device 4a such as a portable telephone set, a radio set, or the like in the main vehicle and supplies the received signals to an input of the control unit 5. The signal processor in the control unit 5 computes a direction of a position of the related vehicle relative to the main vehicle and a distance from the main vehicle to the related vehicle in accordance with the radio signals from the system 10' of the related vehicle. At that time, the data of position of the main vehicle are used from the data, which the GPS receiving unit 1 received from the GPS satellite 30 and were supplied to the control unit 5 through the navigation unit 2. The computed position data of the related vehicle are shown on the display 6a in the display unit 6 of the related vehicle 6 by indicating the direction and distance by means of an arrow and digits (see FIG. 2).

Since the position of the related vehicle is shown on the display 6a which is independent of the display 3a which shows the position of the main vehicle on the map picture, it is not necessary to reduce the map picture showing the position of the main vehicle in order to know the position of the related vehicle relative to the position of the main vehicle and thus it is easy for a person to view the contents of the map picture.

Figure 2A:
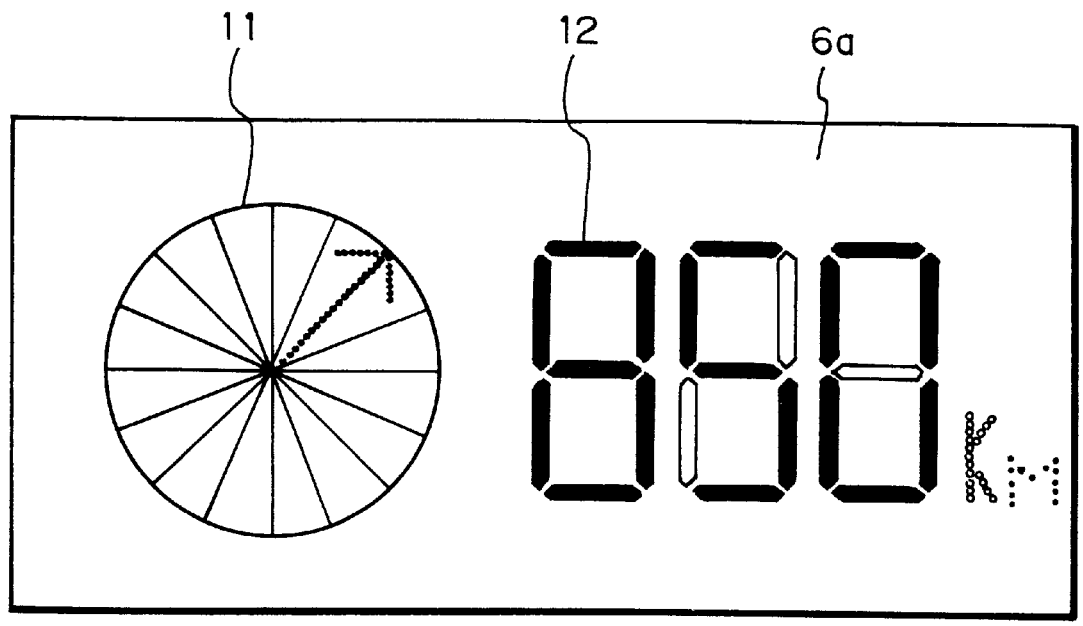
FIGS. 2A and 2B are plan views of display units, FIG. 2A indicating a position of a related vehicle by means of an arrow, FIG. 2B indicating the position by means of characters, and FIGS. 2A and 2B also indicating a distance from a main vehicle to the related vehicle by means of digits.
Figure 2B:
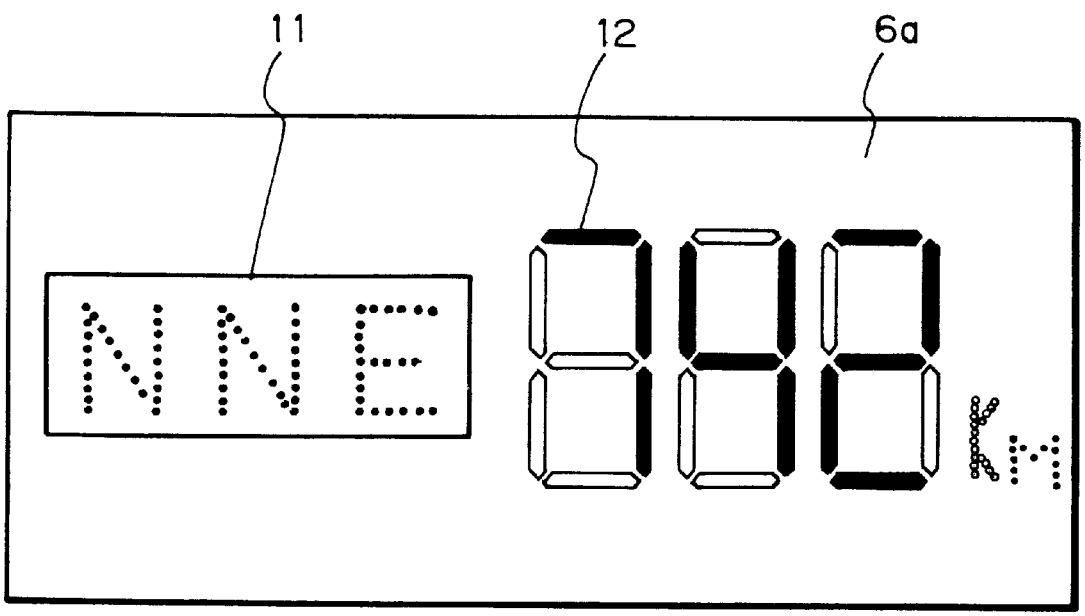

Also, it is possible for a person to readily grasp the position of the related vehicle with respect to the position of the main vehicle in this embodiment, since a direction 11 relative to the main vehicle and a distance 12 from the main vehicle are indicated by means of an arrow and digits, respectively, as shown in FIG. 2A. It is also possible to indicate the direction 11 relative to the main vehicle and the distance 12 from the main vehicle by means of signs and an analogue scale or a digital indication, respectively, as shown in FIG. 2B.

Figure 3:
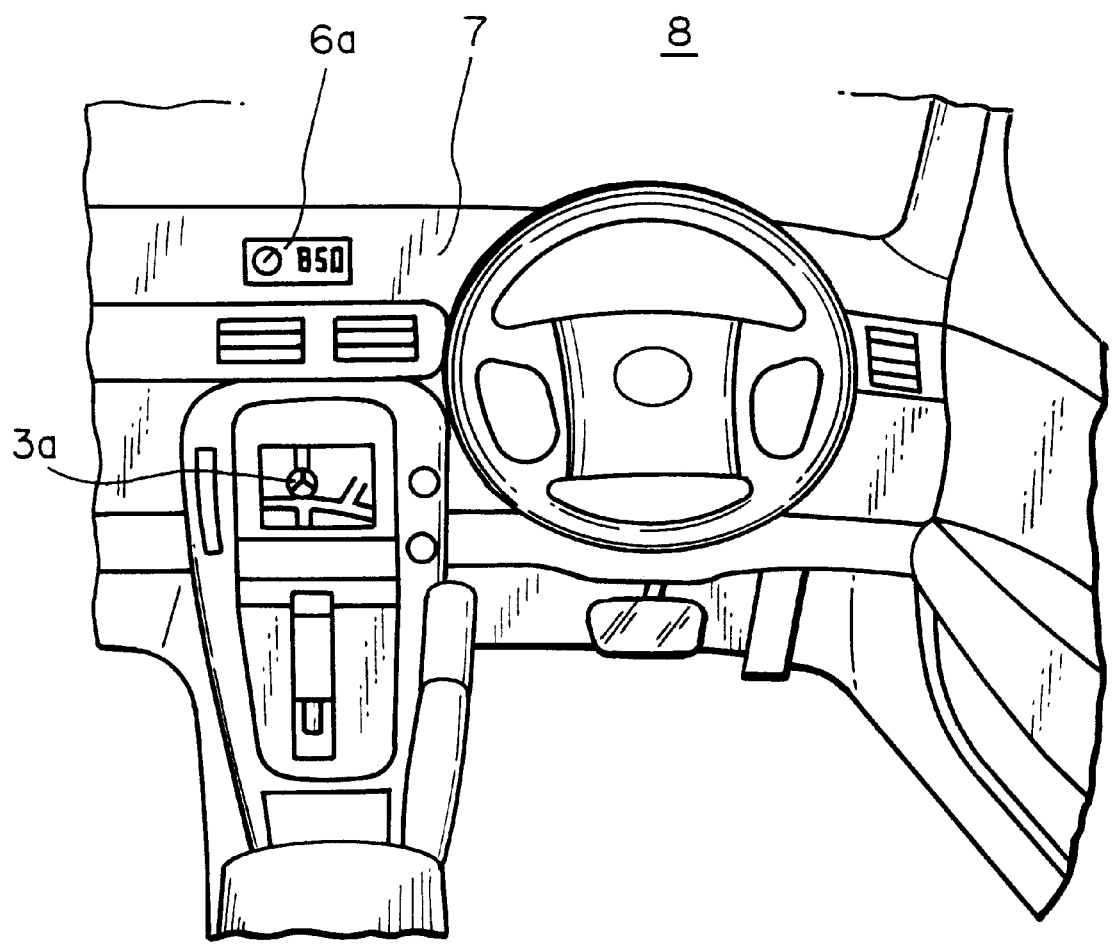
FIG. 3 is a front elevational view of a display unit of a related vehicle position in an interior of an automotive vehicle.
Figure 4A:
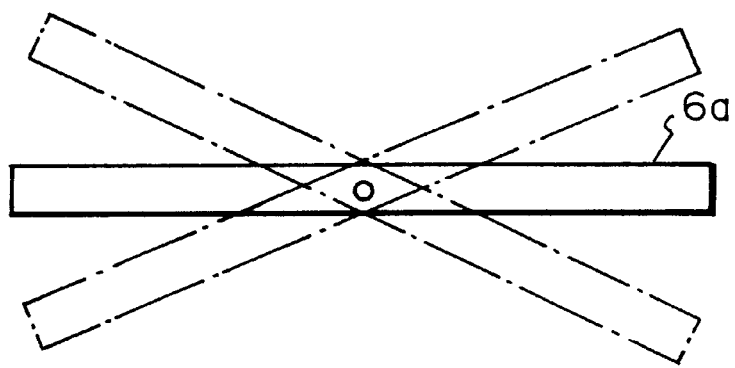
FIGS. 4A and 4B are explanatory views illustrating a rotary structure and a containing structure of the display unit of the related vehicle position.

The display 6a in the display unit 6 of position of the related vehicle, as shown in FIG. 3, is disposed on the center of a dashboard 7. If the display 6a can be turned about a vertical axis as shown in FIG. 4A so that the display 6a can be directed to a driver or a passenger, the passenger will be able to view the display 6a during driving and to relate the position of the related vehicle to the driver. Accordingly, this can enhance safety of driving.

Figure 4B:
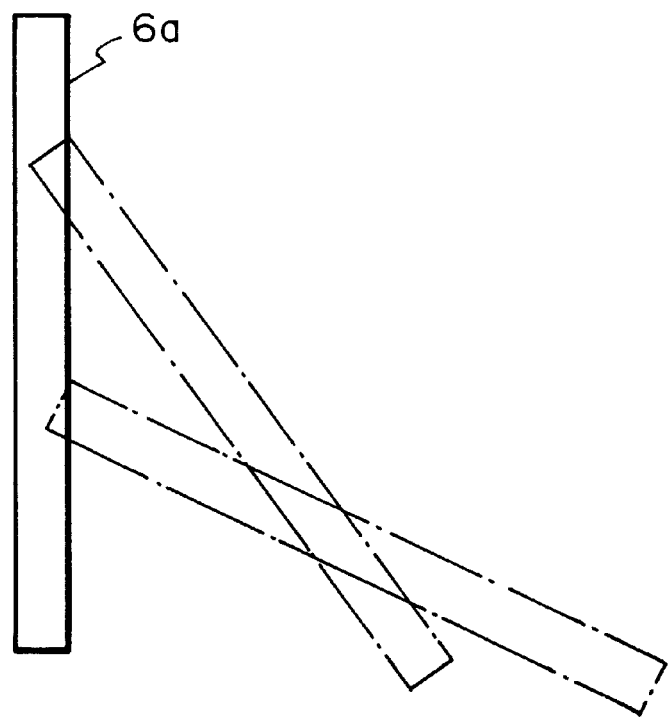
Figure 5:
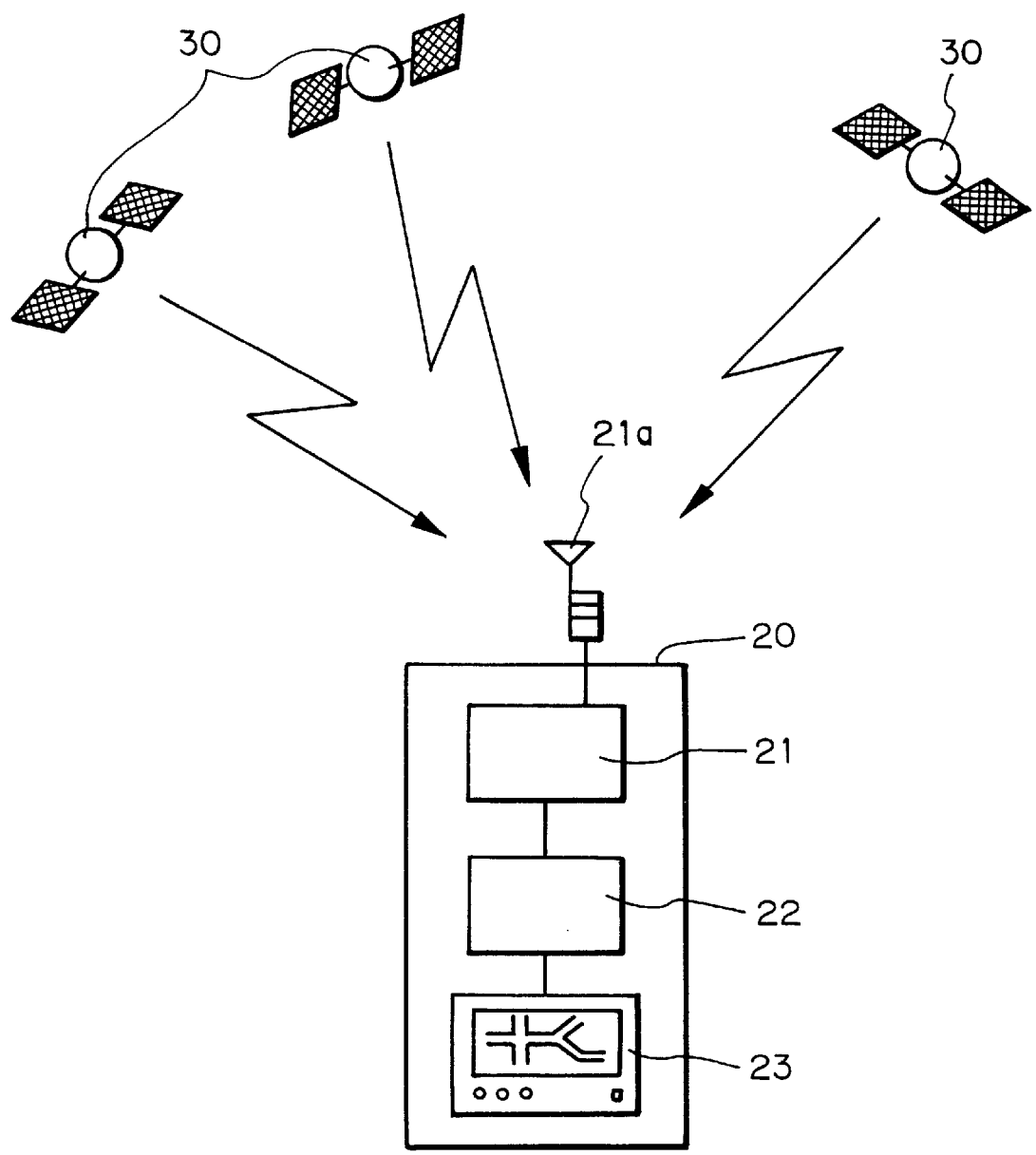
FIG. 5 is a schematic explanatory view of a conventional navigation system.

In the case of requiring no information of position of the related vehicle during driving of a single vehicle, the display 6a may be contained in the dashboard 7 as shown in FIG. 4B which illustrates a side elevational view of the display 6a, in addition to a structure shown in FIG. 4A. The display 6a does not shade a front glass 8 and thus this can enhance driving safety.

It will be preferable for safety of driving to make the display obvious by using colors or brightness.

Although the above embodiment of the system is applied to a car navigation, the embodiment may be applied to ship navigation.

It will be apparent from the foregoing that the navigation system in accordance with the present invention does not reduce the map picture, which indicates the position of the main vehicle, in order to show the position of a related vehicle relative to the position of the main vehicle and can present a simple information illustrating the direction and distance of the related vehicle with respect to the main vehicle.

The entire disclosure of Japanese Patent Application No. Sho 8-330974 filed on Dec. 11, 1996 including specification, claims, drawings and summary is incorporated herein by reference in its entirety.

What is claimed is:

1. A location system for an automotive main vehicle comprising a navigation device including a global positioning system receiving unit, a navigation unit containing pictorial map data in communication with said receiving unit, a first display unit for displaying a position of said main vehicle and at least some of said pictorial map data;

a main vehicle system including a transceiver for receiving position indicating signals transmitted from a signal source of an automotive related vehicle said transceiver being separate from said global positioning system receiving unit, a control unit connected to said navigation unit and said transceiver for computing a position of said related vehicle relative to said main vehicle in accordance with said position indicating signals from said signal source of said related vehicle, and a second display unit, separate from said first display unit, for displaying a position of said related vehicle relative to said main vehicle, said second display includes at least some of said map data.

2. The location system of claim 1 wherein said source is a portable telephone.

3. The location system of claim 1 wherein said source is a radio transmitter.

* * * * *